United States Patent
Rathbun

[15] 3,646,541
[45] Feb. 29, 1972

[54] FLUID LEVEL INDICATOR
[72] Inventor: Ward J. Rathbun, Pontiac, Mich.
[73] Assignee: General Motors Corporation, Detroit, Mich.
[22] Filed: June 4, 1970
[21] Appl. No.: 41,772

Related U.S. Application Data

[63] Continuation of Ser. No. 680,704, Nov. 6, 1967, abandoned.

[52] U.S. Cl. .............................................340/244 C, 331/65
[51] Int. Cl. ....................................G01f 23/24, G08b 21/00
[58] Field of Search ..............................340/244 C; 331/65

[56] References Cited

UNITED STATES PATENTS

| | | | |
|---|---|---|---|
| 3,392,349 | 7/1968 | Bartley | 340/244 C |
| 3,375,716 | 4/1968 | Hersch | 340/244 C |
| 3,397,715 | 8/1968 | Fathaver | 340/244 C |

Primary Examiner—Thomas B. Habecker
Assistant Examiner—Howard S. Cohen
Attorney—Jean L. Carpenter and Paul Fitzpatrick

[57] ABSTRACT

A fluid level indicator utilizing a transistorized relaxation oscillator, which is powered by a DC source, and a probe, which is positioned in a container so as to detect the absence of fluid at some critical level. The probe is either in circuit or out of circuit with the oscillator so that whether the probe is immersed in the fluid or out of the fluid determines the duration of the oscillator output pulses. If the probe is out of the fluid the duration of the output pulses increases enough to energize a relay. The energized relay causes a warning lamp to illuminate and provide a visual warning that the fluid is below the critical level.

4 Claims, 4 Drawing Figures

PATENTED FEB 29 1972
3,646,541
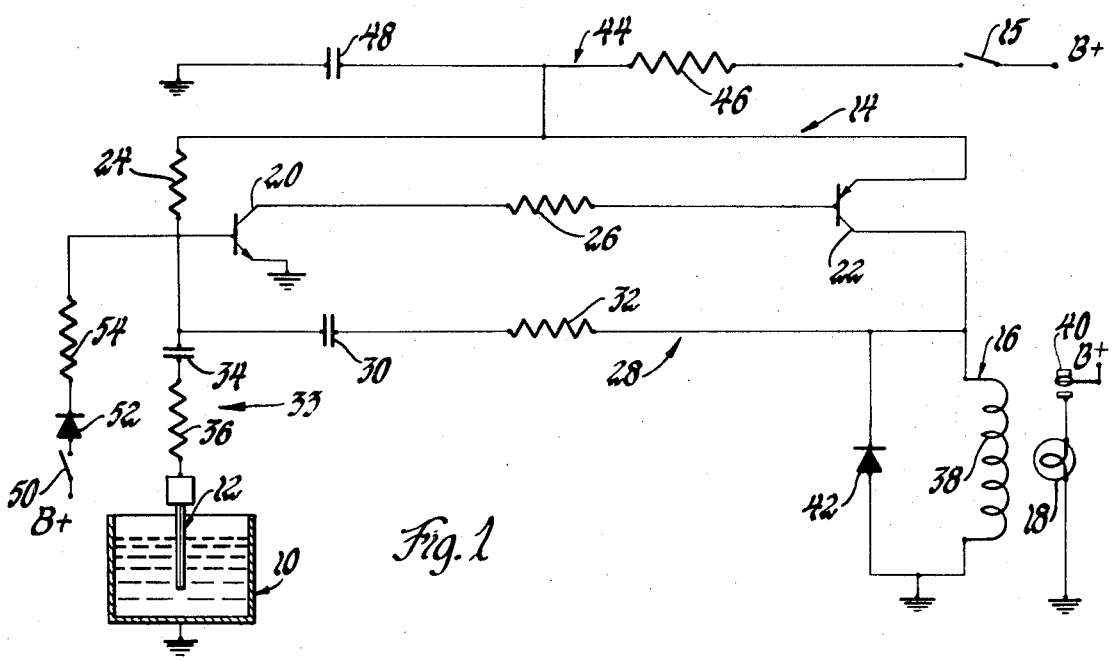
Fig. 1
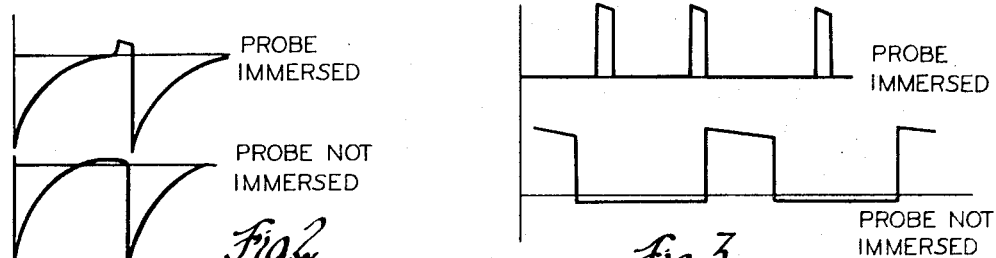
Fig. 2
Fig. 3
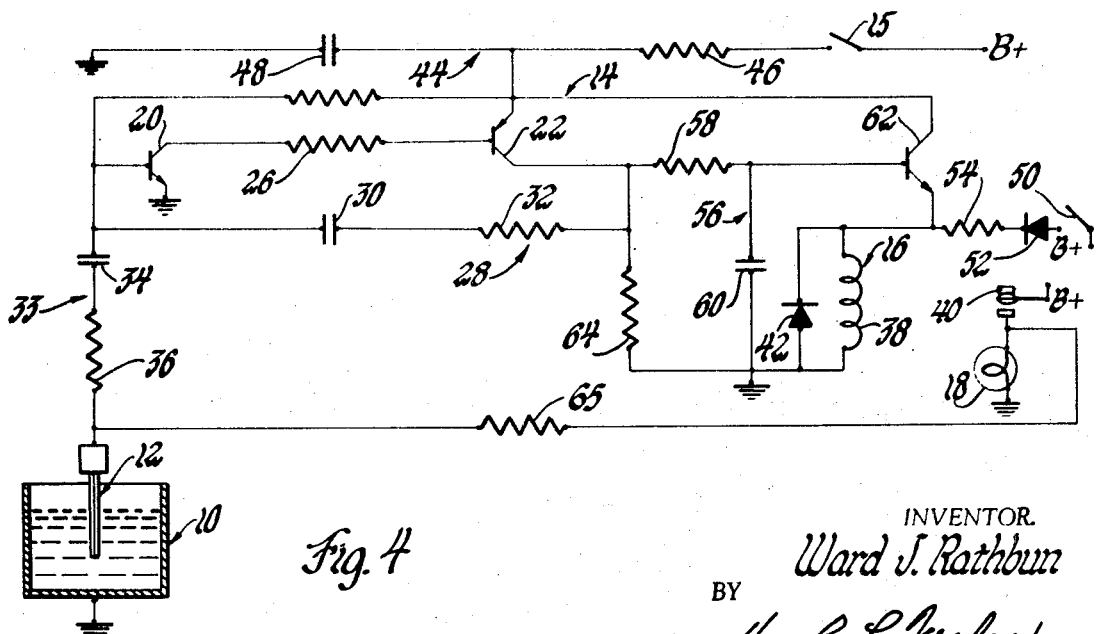
Fig. 4
INVENTOR.
Ward J. Rathbun
BY
Hugh L. Fisher
ATTORNEY

FLUID LEVEL INDICATOR

This application is a Continuation of my application Ser. No. 680,704, filed Nov. 6, 1967 (now abandoned).

DISCLOSURE

This invention relates to an electronic fluid level indicator that senses fluid level and provides a warning when fluid is below a certain level.

The water in a motor vehicle cooling system is, when the vehicle is moving, continuously changing level due to the effects of centrifugal force, acceleration and deceleration. Temperature and viscosity, too, influence the level. Even motion-induced air bubbles can give a false suggestion of no water. All of these influences must be considered whenever accurate fluid level sensing is being sought. Also to be considered are the costs of any proposed fluid level sensor both from an original equipment standpoint and a servicing standpoint.

Accordingly, there is proposed a unique electronic fluid level indicator that utilizes the oscillations from an oscillator to quickly and accurately characterize fluid level. Other and somewhat more specific objects of the invention are the provision of a fluid level indicator that in a new and different way and with a minimum of easily replaceable, relatively inexpensive components, detects fluid level changes and converts these into a correspondingly varied time-constant for an oscillator circuit, which then actuates an appropriate readout device; a fluid level that combines a fluid level sensing probe and a relaxation oscillator circuit so that the duration of the oscillator output pulses is determined by whether or not the probe is immersed in the fluid; a fluid level indicator that can be DC powered without damage from electrolysis; a fluid level indicator that includes a provision for checking the indicator's readout device; and a fluid level indicator that minimizes the possibility of false readings from transients.

Also contemplated is a novel indicator for quickly warning a vehicle operator when engine coolant is below some critical level. Further contemplated is an indicator that is electronically operated with the vehicle's DC power but that isolates the DC power from the sensing probe so that probe damage cannot occur from the electrolytic action of the coolant. Also contemplated is an indicator that incorporates provision for rendering the indicator relatively uninfluenced from coolant level changes due to vehicle movement and that can be easily checked for malfunctions.

In carrying out the invention and according to a preferred form, a DC powered relaxation oscillator incorporating a pair of opposite conductivity type, direct-coupled transistor is connected to a relay. The oscillator's timing circuit has a branch that includes a fluid level sensing probe when immersed in fluid. The branch then becomes a part of the oscillator's timing circuit and causes the time-constant to be changed; i.e., from the time-constant provided when the probe is not immersed in the fluid and no longer a part of the timing circuit. A change in the time-constant affects duration of the output pulses from the oscillator such that the pulse duration is longer when the probe is out of the fluid. The resultant increase in the average DC level of the oscillator output energizes the relay, which then connects a warning lamp to the DC source and a visual warning is provided. To check the condition of the warning lamp, provision is made for operating the indicator so that if the warning lamp is inoperative it will not illuminate.

The foregoing and other objects and advantages will become apparent from the following description and the accompanying drawings, in which:

FIG. 1 is a schematic circuit diagram of a fluid level indicator incorporating the principles of the invention;

FIGS. 2 and 3 are voltage-time diagrams respectively of the input and the output to and from the indicator's oscillator when the indicator's probe is and is not immersed; and FIG. 4 is a circuit diagram of a modified fluid level indicator incorporating additional features.

Referring first to FIG. 1, the fluid level indicator is illustrated monitoring the level of fluid in a container 10. For exemplary purposes, it will be assumed that the container 10 is a motor vehicle radiator and that it is electrically connected to the vehicle frame (not shown), which serves as the ground or the low potential side of the DC source, indicated as B+. B+ would be the vehicle battery (not shown) and would have its negative terminal connected to the vehicle frame. The coolant in the radiator 10 is assumed to be water and its level is sensed by a stainless steel probe 12 that may be positioned vertically, as illustrated, or, if more convenient, positioned horizontally. If the probe 12 is supported by the radiator 10 it should be suitably insulated therefrom to avoid current leakage. Also, all but the tip of the probe 12 should be insulated for the same reason.

The indicator further includes a relaxation oscillator, denoted generally at 14. This oscillator 14 is powered by B+ when an ignition switch 15 is closed and the characteristics of its oscillations will be determined, as will be explained, by whether or not the probe 12 is immersed in the water. When the probe 12 is out of the water a relay 16 connected to the oscillator output will be energized and connect a warning lamp 18 to B+.

Instead of a warning lamp 18 any other suitable visual or audio warning device, such as a buzzer, can be activated to warn the vehicle operator.

Describing next the details of the oscillator 14, NPN and PNP transistors 20 and 22 are each connected in a common emitter configuration and are direct coupled. The transistor 20 has its emitter grounded and its base connected by way of a bias resistor 24 to B+. The transistor 22 has its emitter connected to B+, its base connected directly to the collector of transistor 20, through another bias resistor 26, and its collector connected to the relay 16.

The transistors 20 and 22 are of opposite conductivity types relative to each other but need not individually be of the mentioned type. By reversing bias connections in a well known way, the transistor 20 can be of the PNP type and the transistor 22 of the NPN type.

To maintain oscillations, the oscillator 14 also includes a timing circuit, shown generally at 28, comprising a primary timing capacitor 30 and a primary timing resistor 32 series-connected between the collector of the transistor 22 and the base of the transistor 20. This timing circuit 28 controls the duration of the pulses from the oscillator 14 and includes in a branch 33 thereof the probe 12, a secondary timing capacitor 34 and a secondary timing resistor 36 connected in series between the base of the transistor 20 and the timing capacitor 30. As will be noted, the secondary timing capacitor 34 and the resistor 36 are in parallel with the primary timing capacitor 30 and the resistor 32.

The relay 16 includes a coil or winding 38 and normally open contacts 40. The relay winding 38 is connected at one end to the collector of the transistor 22 and at the other end is grounded. When energized, the contacts 40 are closed and connect the indicator lamp 18 to B+. A diode 42 serves the usual function of providing a shunt path for current surges induced by the collapse of the magnetic field of the winding 38 when collector current flow ceases and thus protects the transistor 22 against these current surges.

Because the indicator, as explained, is being utilized with a motor vehicle, a filter generally shown at 44 is inserted between B+ and the oscillator 14 to filter out any transients produced by the vehicle's electric system, such as those that might originate in the ignition system. The filter 44 comprises a filter resistor 46 and a grounded filter capacitor 48, and insures that these transients do not cause the oscillator 14 to provide false warnings, and also prevents these transients from damaging the oscillator 14.

The indicator also includes a checking feature. By closing a switch 50, battery potential (B+) is applied through a diode 52 and a dropping resistor 54 to the oscillator 14. This potential will drive the oscillator 14, i.e., turn on hard both the transistor 20 and the transistor 22 and preclude oscillations, so that the relay 16 is energized and the warning lamp 18 is continuously illuminated. The operator then knows whether or not the lamp 18 is defective and can have it promptly replaced if defective. Otherwise, if the lamp 18 was defective no warning would be provided and it would be falsely assumed that the radiator water level was proper. If preferred, the switch 50 can be a part of the ignition switch 15 and closed whenever the motor vehicle engine is cranked.

Considering the operation and initially that of the oscillator 14, when the probe 12 is not immersed in the water, a positive voltage is supplied by B+ when the ignition switch 15 is closed to the base of the transistor 20 and also to the primary timing capacitor 30 to commence charging it. The complete charging path extends from the primary timing capacitor 30 to B+ by way of the bias resistor 24 and the filter resistor 46, and to B− or ground by way of the primary timing resistor 32 and the relay winding 38. The timing capacitor 30 will charge until the base of transistor 20 is sufficiently positive to turn it on. The voltage curve for the transistor 20's base is shown in FIG. 2 and is identified "Probe Not Immersed." When the transistor 20 turns on its negative-going collector, current will be supplied to the base of the transistor 22 and the transistor 22 will also commence to conduct with a positive-going collector current being supplied to the relay winding 38. Now the primary timing capacitor 30 will start to discharge through a path that includes the primary timing resistor 32, the emitter-collector junction of the transistor 22 and the bias resistor 24 until the base potential decreases to the turnoff level for the transistor 20. Then transistor 20 will stop conducting and turn off the transistor 22. The primary charging capacitor 30 will recommence to charge as before and this cycle thereafter repeats.

As depicted by the just mentioned voltage curve, the charging and discharging times are substantially equal. This is because the filter resistor 46 and the relay winding 38, which only effect the charging time-constant, not being in the discharge path, have small resistance values when compared to the overall resistance. Therefore, they have negligible influence on the charging time-constant. Accordingly and as seen in FIG. 3, the output pulse at the transistor 22's collector is wide and of a relatively long duration; i.e., of such a duration that the average DC level is adequate to energize the relay 16 and close contacts 40. The vehicle operator is then visibly warned with the lamp 18 now illuminated that the probe 12 is not immersed and that the radiator water is below an acceptable level.

The foregoing describes the operation of the oscillator 14, when, as explained, the probe 12 is not immersed in the radiator water. When the probe 12 is immersed in the water the timing circuit branch 33 is grounded through the resistive path provided by the conductive water. As will become apparent, this changes the time-constant. Now when the ignition switch 15 is closed both the primary and secondary timing capacitors are connected to B+ and start to charge. The charging path for the secondary timing capacitor 34 is from B+ through the filter resistor 46 and the bias resistor 36, and from B− or ground through the water and the secondary timing resistor 36. The primary timing capacitor 30 has the same charging path as that described when the probe 12 is out of water. The capacitance of the secondary timing capacitor 34 is, as the hereinafter suggested values illustrate, considerably greater than that of the primary timing capacitor 30. This permits the capacitor 34 to assume control of the turn-on of the transistor 20. The primary timing capacitor 30 and the capacitor 34 being in parallel will charge accordingly and until the base turn-on voltage is reached. The charging time will be determined by the total RC of the combined components and is illustrated in the FIG. 2 base voltage curve for the transistor 20 identified "Probe Immersed." In comparing the "Probe Immersed" and the "Probe Not Immersed" curves it will be noted that the charging time is increased with the probe 12 immersed due to the introduction of the additional resistance and capacitance.

Conduction by the transistor 20 turns on the transistor 22 as before and the primary timing capacitor 30 discharges through the same discharge path in the previously described way. The secondary timing capacitor 34's discharge path extends through the base-emitter junction of the transistor 20 to ground and through the secondary timing resistor 36, the probe 12, and the water to ground, and thus bypasses the bias resistor 24. With the capacitor 34 discharging in this way there will be less resistance without the bias resistor 24 and the discharge time-constant is less as the FIG. 2 "Probe Immersed" base bias voltage curve shows. Hence, the transistor 20 is turned off sooner; i.e., conducts for a shorter time than when the probe 12 is not immersed. The result is the shorter duration output pulses depicted in FIG. 3. The average DC level of these output pulses is less than the level required to energize the relay 16. Hence, the warning lamp 18 is not illuminated as long as the probe 12 is immersed.

Although DC power is used, the DC component of this power in the branch 33 with the probe 12 immersed cannot produce electrolysis. Therefore, the secondary timing capacitor 34 serves the additional function of isolation or blocking of this DC component and avoids damage to the probe 12 from the electrolytic action.

Some suggested components and values for the FIG. 1 indicator are as follows and have resulted in very satisfactory operation with approximately a 12-14- volt battery.

| | | |
|---|---|---|
| transistor 20 | 2N2923 | (General Electric) |
| transistor 22 | 2N3906 | (Motorola) |
| resistor 54 | 150K-½ watt | |
| resistor 24 | 220K-½ watt | |
| resistor 36 | 6,800 ohms-½ watt | |
| resistor 26 | 470 ohms-½ watt | |
| resistor 32 | 2,200-2,700 ohms-½ watt | |
| resistor 46 | 47 ohms-1 watt | |
| capacitor 34 | 1 microfarad-35 VDC | |
| condenser 30 | 0.047 microfarad-200 VDC | |
| condenser 48 | 150 microfarads-15 VDC | |
| diode 52 | IN3754 | (RCA) |
| diode 42 | IN2071 | (Sylvania) |
| relay 16 | No. 1090020 | (RBM) |

The modified FIG. 4 circuit incorporates additional features. Otherwise, the circuit is the same as the FIG. 1 circuit and those parts that are similar have the same numbers. Because the water in a moving motor vehicle moves considerably, being subject to centrifugal force and also acceleration and deceleration forces, there may be in certain applications, times when the probe 12 is temporarily out of the water. Therefore, it is possible that a false warning will be made. To avoid this possibility, if such is a problem, the FIG. 4 circuit additionally incorporates a time delay network, denoted generally at 56. The network 56 is connected to the collector of the transistor 22 and comprises a resistor 58 and a capacitor 60. An additional transistor 62 that serves as an amplifier is connected between the network 56 and the relay 16.

The oscillator 14 in this FIG. 4 circuit operates similarly to that in the FIG. 1 circuit. When the oscillator output has a short pulse duration indicative of a "Probe Immersed" condition, this output will appear across a resistor 64 but will not have a long enough duration to charge the capacitor 60 in the time delay network 56 to the value required to turn on the amplifying transistor 62. Stated somewhat differently, the oscillator output pulse width cannot cause the capacitor 60 to acquire enough charge to turn on the transistor 62. The oscillator will oscillate in the same way as that in the FIG. 1 circuit and, as before, the relay 16 will not be energized.

When, however, the probe 12 is out of water, as explained, the output pulse duration increases and this output now appearing across the resistor 64 will charge the capacitor 60 in the time delay network 56, through the resistor 58, to the turn-non voltage of the amplifying transistor 62. The oscillator 14 no longer oscillates and all of the transistors 20, 22 and 62 assume a steady state on condition so that the capacitor 60 charges to substantially the B+ voltage. With the amplifying transistor 62 conducting, the relay 16 will be energized and turn on the warning lamp 18. This latter condition only can occur when the probe 12 is out of the water for a longer period of time than the time delay provided by the time delay network 56. Consequently, any time the prove 21 is temporarily out of the water due to vehicle movements, it will not cause false warnings.

In the FIG. 4 circuit is bias resistor 65 is connected form the probe 12 through the warning lamp 18 to ground. This bias resistor 65 provides a DC bias when the probe 12 is not grounded through the water; i.e., the probe end of the secondary timing capacitor 34 is maintained positive by applying B+ across the bias resistor 65 when contacts 40 are closed. This prevents the capacitor 34, when the probe 12 is not immersed, from being charged so as to be positive at the top in the event a high leakage path for current should be provided from the probe 12 to the container 10 due to steam, foam or contamination. Otherwise, the capacitor 34 would be charged by the current leakage and, thereafter, when the probe 12 was immersed, the capacitor 34 would not discharge. Thus, the indicator can reset itself after each indication.

The FIG. 1 checking feature is included except that B+ is connected, when the switch 50 is closed, directly to the top of the relay winding 38 and not to the base of the transistor 20. This energizes the relay 16 and the lamp 18 will illuminate if operative.

From the foregoing it will be appreciated that a transistorized fluid level indicator is provided that utilizes a simple relaxation oscillator circuit which has one pulse duration when in the fluid and another when out of the fluid. Provision is made for advoiding false readings and DC power is used without concern for destruction of the probe due to DC generated electrolytic action. Further rendering the indicator effective is the checking feature that permits the warning lamp's malfunction to be isolated.

What is claimed is;:

1. In an indicator for detecting the level of fluid in a container, the combination of a fluid level probe positioned within the container so as to be immersed in the fluid when the fluid is at a predetermined level to be detected, a DC source in circuit with the container, a warning device, relay means operative when energized to cause the warning device to be actuated, an oscillator driven by the DC source and having the relay means in the output thereof, the oscillator including direct-coupled input and output transistors of opposite conductivity types, the input transistor having the base-emitter thereof connected across the DC source and the collector thereof connected to the base of the output transistor, a resistance in series with the DC SOURCE AND THE BASE OF the input TRANSISTOR, THE OUTPUT TRANSISTOR HAVING THE EMITTER-collector thereof connected across the DC source, the emitter thereof connected to the base of the input transistor and the collector thereof connected to the relay means, a timing circuit including a primary timing capacitor and a primary timing resistor in series and interconnecting the collector of the input transistor with the base of the input transistor, the timing circuit being operative to control the duration of the pluses supplied to the relay means. a probe having a series therewith a secondary timing resistor and a secondary timing capacitor, the probe when immersed in the fluid connecting the secondary resistor and secondary capacitor between the lower potential side of the DC source and the timing circuit so that the timing circuit has a certain time-constant and the output pulses have a corresponding duration inadequate to cause the relay means to be energized., the probe when not immersed in the fluid disconnecting the secondary capacitor from between the low potential side of the DC source and the timing circuit so that the timing circuit has another time-constant uninfluenced by the secondary resistor and the secondary capacitor and the output pulses have an increased duration for causing the relay means to be energized and accordingly the warning device to be actuated.

2. In an indicator for detecting the level of fluid in a container, the combination of a fluid level probe positioned within the container so as to be immersed in the fluid when the fluid is at a predetermined level to be detected, a DC source in circuit with the container, a warning device, relay means operative when energized to cause the warning device to be actuated, an oscillator driven by the DC source, a time delay network interconnecting the relay means and the output of the oscillator and operative to prevent transients from energizing the relay means, the oscillator including direct-coupled input and output transistors of opposite conductivity types, the input transistor having the base-emitter thereof connected across the DC source and the collector thereof connected to the base of the output transistor, a resistance in series with the DC source and the base of the input transistor, the output transistor having the emitter-collector thereof connected across the DC source, the emitter thereof connected to the base of the input transistor and the collector thereof connected to the time delay network, a timing circuit including a primary timing capacitor and a primary timing resistor in series and interconnecting the collector of the output transistor with the base of the input transistor, the timing circuit being operative to control the duration of the pulses supplied to the relay means, a probe having in series therewith a secondary timing resistor and a secondary timing capacitor, the probe when immersed in fluid connecting the secondary resistor and secondary capacitor between the low potential side of the DC source and the timing circuit so that the timing circuit has a certain time-constant and the output pulses have a corresponding duration inadequate to cause the relay means to be energized, the probe when not immersed in the fluid disconnecting the secondary capacitor from between the low potential side of the DC source and the timing circuit so that the timing circuit has source time-constant uninfluenced by the secondary resistor and the secondary capacitor and the output pulses have an increased duration for causing the relay means to be energized and accordingly the warning device to be actuated.

3. In an indicator for detecting the level of fluid in a container, the combination of the fluid level probe positioned within the container so as to be immersed in the fluid when the fluid is at a predetermined level to be detected, a DC source in circuit with the container, a warning device, relay means operative when energized to connect the warning device to the DC source so as to cause the warning device to be actuated, an oscillator driven by the DC source, a time delay network interconnecting the relay means and the output of the oscillator and operative to prevent transients from energizing the relay means, the oscillator including direct-coupled input and output transistors of opposite conductivity types, the input transistor having the base emitter path thereof connected across the DC source and the collector thereof connected to the base of the output transistor, a resistance in series with the DC source and the base of the input transistor, the output transistor having the emitter-collector thereof connected across the DC source, the emitter thereof connected to the base of the input transistor and the collector thereof connected to the time delay network, a timing circuit including a primary timing capacitor and a primary timing resistor in series and interconnecting the collector of the output transistor with the base of the input transistor, the timing circuit being operative to control the duration of the pulses supplied to the relay means, a probe having in series therewith a secondary timing resistor and a secondary timing capacitor, the probe when immersed in the fluid connecting the secondary resistor and secondary capacitor between the lower potential side of the DC source of the timing circuit so that the timing circuit has a certain time-constant and the output pulses have a corresponding duration inadequate to cause the relay means to be energized, the probe when not immersed in the fluid disconnecting the secondary capacitor source between the lower potential side of the DC source and the timing circuit so that the timing circuit has another time-constant uninfluenced by the secondary resistor and the secondary capacitor and the output pulses have an increased duration for causing the relay means to be energized and accordingly the warning device to be actuated, and switch means connecting the DC SOURCE to the oscillator or as to energize the relay means and check the operability of the warning device.

4. In an indicator for detecting the level of fluid in a container, the combination of a fluid level probe positioned with the container so as to be immersed in the fluid when the fluid is at a predetermined level to be detected, a DC source in circuit with the container, a warning device, relay means operative when energized to connect the warning device to the DC source to cause the warning device to be actuated, an oscillator driven by the DC source, a time delay network interconnecting the relay means and the output of the oscillator, and operative to prevent transients from energizing the relay means, the oscillator including direct-coupled input and output transistors of opposite conductivity types, the input transistor having the base-emitter thereof connected across the DC source and the collector thereof connected to the base of the output transistor, a resistance in series with the DC source and the base of the input transistor, the output transistor having the emitter-collector thereof connected across the DC source, the emitter thereof connected to the base of the input transistor and the collector thereof connected to the time delay network, a timing circuit including a primary timing capacitor and a primary timing resistor in series and interconnecting the collector of the output transistor with the base of the input transistor, the timing circuit being operative to control the duration of the pulses supplied to the relay means, a probe having in series therewith a secondary timing resistor and a secondary timing capacitor, the probe when immersed in the fluid connecting the secondary resistor and secondary capacitor between the low potential side of the DC source and the timing circuit so that the timing circuit has a certain time-constant and the output pulses have a corresponding duration inadequate to cause the relay means to be energized, the probe when not immersed in the fluid disconnecting the secondary capacitor from between the low potential side of the DC source and the timing circuit so that the timing circuit has another time-constant uninfluenced by the secondary resistor and the secondary capacitor and the output pulses have an increased duration for causing the relay means to be energized and accordingly the warning device to be actuated, switch means connecting the DC source to the secondary timing capacitor when the probe is not immersed in the fluid so that secondary timing capacitor can become operative when the probe is subsequently immersed in the fluid.

* * * * *

PO-1050
(5/69)

UNITED STATES PATENT OFFICE
CERTIFICATE OF CORRECTION

Patent No. 3,646,541     Dated February 29, 1972

Inventor(s) Ward J. Rathbun

It is certified that error appears in the above-identified patent and that said Letters Patent are hereby corrected as shown below:

Column 5, line 8, "prove 21" should read -- probe 12 --; line 11, "circuit is bias resistor 65 is connected form the" should read -- circuit a bias resistor 65 is connected from the --; line 34, "advoiding" should be -- avoiding --; line 59, "input" should be -- output --; line 61, "pluses" should be -- pulses --; line 62, "having a series" should read -- having in series --; line 65, "lower" should be -- low --. Column 6, line 36, "source" should be -- another --; line 42, "of the fluid" should read -- of a fluid --; line 68, "lower" should be -- low --; line 69, "source of" should read -- source and --; line 73, "capacitor source between the lower" should read -- capacitor from between the low --; Column 7, line 10, "with" should be -- within --; line 15, "source to" should read -- source so as to --. Column 8, line 21, after "to the" and before "seconda-", insert -- relay means so as to check the operability of the warning device, and reset means connecting the DC source to the --.

Signed and sealed this 1st day of August 1972.

(SEAL)
Attest:

EDWARD M. FLETCHER, JR.           ROBERT GOTTSCHALK
Attesting Officer                  Commissioner of Patents